J. H. CRONICK.
TREE STAND.
APPLICATION FILED APR. 12, 1915.

1,240,319.

Patented Sept. 18, 1917.

Witnesses

Inventor
J. H. Cronick
By
Attorney

UNITED STATES PATENT OFFICE.

JOSEPH H. CRONICK, OF UNIONTOWN, PENNSYLVANIA.

TREE-STAND.

1,240,319.

Specification of Letters Patent.   Patented Sept. 18, 1917.

Application filed April 12, 1915.   Serial No. 20,823.

*To all whom it may concern:*

Be it known that I, JOSEPH H. CRONICK, a citizen of the United States, residing at Uniontown, in the county of Fayette, State of Pennsylvania, have invented certain new and useful Improvements in Tree-Stands; and I do hereby declare the following to be a full, clear, and exact description of the invention, such as will enable others skilled in the art to which it appertains to make and use the same.

This invention relates to tree stands and especially to a type adapted for supporting Christmas trees in upright position.

The object of the invention resides in the provision of a tree stand of the character named embodying an improved construction whereby same is rendered exceedingly simple, easily applied, and adapted to be folded when not in use so as to occupy a very small space.

A further object of the invention resides in the provision of a tree stand adapted to be constructed out of ordinary strap metal and which can be applied and removed from a desired tree with the use of only an ordinary hatchet or hammer.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 2:
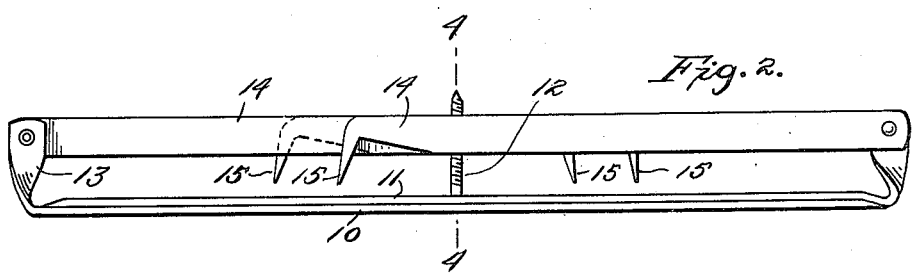
Fig. 2, is a side view of the tree stand folded.
Figure 3:

Fig. 3, a top view of what is shown in Fig. 2, and

Figure 4:
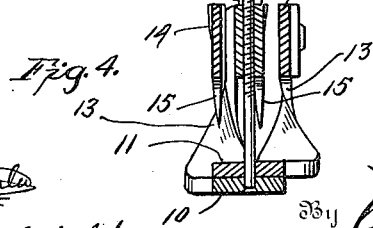

Fig. 4, a section on the line 4—4 of Fig. 2.

Figure 1:
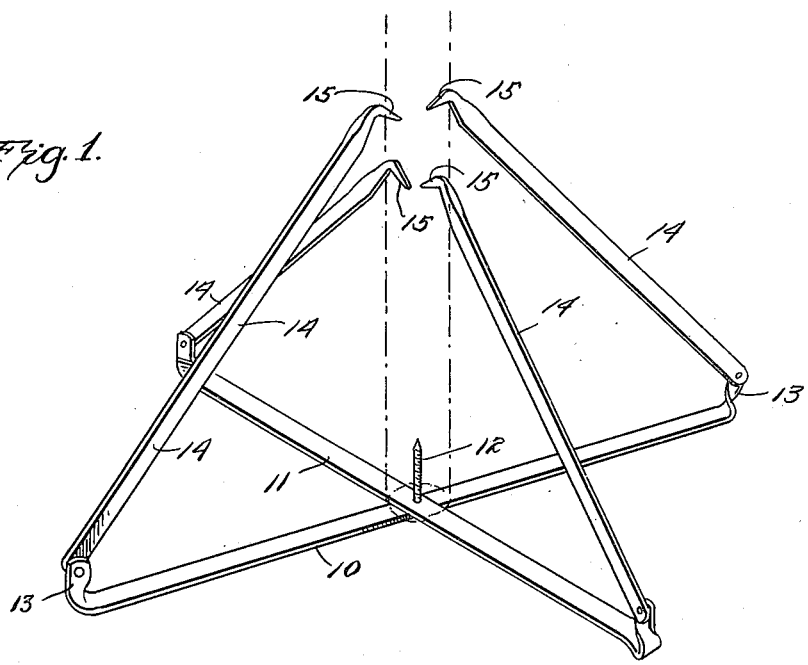
Figure 1 is a perspective view showing the improved tree stand applied, the tree being shown in dotted lines.

Referring to the drawings the improved tree stand is shown as comprising base members 10 and 11, the former of which carries a stud 12 disposed centrally thereof, said stud passing through the center of the member 11 and the latter being adapted to pivot upon said stud whereby the member can be moved either to a position at right angles to the member 10 as shown in Fig. 1 or to the position shown in Fig. 3. The terminals of the member 10 are bent laterally as at 13 and are twisted at the bend so as to form ears disposed in the plane of the related base member. Pivoted to each of the laterally bent terminals 13 is a brace 14 adapted to swing in the plane of the associated base member and having its free end provided with an inwardly directed spike 15. In applying the stand the stud 12 is driven into the lower end of the tree trunk with a hammer or hatchet. The member 11 is then swung to a position at right angles to the member 10 and the spike 15 driven into the tree trunk as shown in Fig. 1 when the application of the stand is complete.

When the device is not in use the base members 10 and 11 can be moved to the position shown in Fig. 3 and the brace arms 14 folded inwardly so as to lie side to side. When so folded the device is very compact and can be easily handled and stored in a small space.

What is claimed is:—

A tree stand comprising a base member, a stud mounted centrally in said base member, a second base member pivotally mounted upon said stud and disposed at all times entirely above the first base member, the terminals of said base members being bent upwardly and twisted to form ears disposed in the plane of the associated base member, brace arms pivoted to respective ears, and inwardly directed spikes on the free ends of said brace arms.

In testimony whereof, I affix my signature, in the presence of two witnesses.

JOSEPH H. CRONICK.

Witnesses:
 CHAS. S. BOWMAN,
 CORA B. WYNCOOP.